United States Patent
Garg et al.

(10) Patent No.: US 9,426,211 B2
(45) Date of Patent: Aug. 23, 2016

(54) SCALING EVENT PROCESSING IN A NETWORK ENVIRONMENT

(71) Applicant: CISCO TECHNOLOGY, INC., San Jose, CA (US)

(72) Inventors: Gaurav Garg, Bangalore (IN); Aditya Pandit, Pune (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 427 days.

(21) Appl. No.: 13/974,714

(22) Filed: Aug. 23, 2013

(65) Prior Publication Data

US 2015/0058449 A1 Feb. 26, 2015

(51) Int. Cl.
*H04L 29/08* (2006.01)
*H04L 12/24* (2006.01)
*G06F 9/54* (2006.01)

(52) U.S. Cl.
CPC ............. *H04L 67/10* (2013.01); *G06F 9/542* (2013.01); *H04L 41/00* (2013.01)

(58) Field of Classification Search
None
See application file for complete search history.

(56) References Cited

U.S. PATENT DOCUMENTS

| 6,188,694 | B1* | 2/2001 | Fine | H04L 12/4645 370/402 |
| 7,475,142 | B2* | 1/2009 | Sharma | G06F 17/30197 707/E17.01 |
| 7,668,953 | B1 | 2/2010 | Sinclair et al. | |
| 2005/0223014 | A1* | 10/2005 | Sharma | G06F 17/30197 |

OTHER PUBLICATIONS

DeVille, Barry, "Chapter 1: Decision Trees—What are They?" *Decision Trees for Business Intelligence and Data Mining: Using SAS Enterprise Miner*, (Nov. 2006)., © 2006 SAS Institute, Inc., Cary, NC.

Bhaduri, et al., Distributed Decision Tree Induction in Peer-to-Peer Systems, Journal Statistical Analysis and Data Mining, vol. 1 Issue 2, pp. 85-103 (Jun. 2008).

Bahrepour, et al., "Distributed Event Detection in Wireless Sensor Networks for Disaster Management," Proceedings of 2010 International Conference on Intelligent Networking and Collaborative Systems (2010), Thessaloniki, Greece; 978-0-7695-4278-2/10 © 2010 IEEE DOI 10.1109/INCOS.2010.24507; 6 pages.

Bar-Or, et al., "Decision Tree Induction in High Dimensional, Hierarchically Distributed Databases," Proceedings of the Fifth SIAM International Conference on Data Mining, pp. 466-470, Apr. 2005, Newport Beach, CA; 5 pages.

(Continued)

*Primary Examiner* — Ranodhi Serrao
(74) *Attorney, Agent, or Firm* — Patent Capital Group

(57) ABSTRACT

An example method for scaling event processing in a network environment is provided and includes maintaining a first portion of a decision tree at a first server in the network environment, delegating a second portion of the decision tree from the first server to a second server, processing event data substantially simultaneously at the first server using the first portion of the decision tree and at the second server using the second portion of the decision tree, wherein the processing comprises determining a match between the event data and information stored at nodes in the decision tree. In various embodiments, the decision tree is distributed across a plurality of servers in the network, wherein each participating server maintains a local copy of a respective portion of the decision tree and processes the event data using the respective portion.

20 Claims, 17 Drawing Sheets

(56) References Cited

OTHER PUBLICATIONS

Basharu et al., "Delegation in Tree-search for Distributed Constraint Satisfaction," Proceedings of Workshop on Distributed Constraint Reasoning, pp. 98-112, Jan. 6-12, 2007, Hyderabad, India; 15 pages.
Ben-Haim, et al., "A Streaming Parallel Decision Tree Algorithm," The Journal of Machine Learning Research, vol. 11, Mar. 1, 2010, pp. 849-872.
Cisco Systems Inc., "Cisco Assurance Services for IP Next-Generation Networks," Cisco Systems Data Sheet © 1992-2009 Cisco Systems, Inc.; 4 pages.
Gupta, et al., "Parallel Algorithms and Architectures for Rule-Based Systems," Proceedings of the 13th Annual International Symposium on Computer Architecture, pp. 28-37, Jun. 3-6, 1986, Tokyo, Japan.
Jboss.org., Community Documentation,"Chapter 2. Drools Fusion Features," [Retrieved and printed May 30, 2013] http://docs.jboss.org/drools/release/5.3.0.CR1/drools-fusion-docs/html/ch02.html; 29 pages.
Jin, et al., "Communication and Memory Efficient Parallel Decision Tree Construction," Proceedings of Third SIAM Conference on Data Mining, May 1-3, 2003, San Francisco, CA; 11 pages.
Narlikar, Girija J., "A Parallel, Multithreaded Decision Tree Builder," Dec. 1998, Carnegie Mellon University, Pittsburgh, PA; 14 pages.
Nisar, et al., "Delegation-Based I/O Mechanism for High Performance Computing Systems," IEEE Transactions on Parallel and Distributed Systems, vol. 23, No. 2 (Feb. 2012); 9 pages.
Selvamony, Robinson, "Introduction to the Rete algorithm," SAP Community Network, Dec. 17, 2010, SAP Labs India; 8 pages.
Verhagen, et al., "Adjustable Autonomy, Delegation and Distribution of Decision Making," Proceedings of First International Workshop of Central and Eastern Europe on Multi-agent Systems (CEEMAS-99) Jun. 1-4, 1999, St. Petersburg, Russia; 10 pages.

* cited by examiner

SCALING EVENT PROCESSING IN A NETWORK ENVIRONMENT

TECHNICAL FIELD

This disclosure relates in general to the field of communications and, more particularly, to scaling event processing in a network environment.

BACKGROUND

Data centers are increasingly used by enterprises for collaboration and for storing data and/or resources. A typical data center network contains myriad network elements, including hosts, load balancers, routers, switches, etc. The network connecting the network elements provides secure user access to data center services and an infrastructure for deployment, interconnection, and aggregation of shared resource as required, including applications, hosts, appliances, and storage. Improving operational efficiency and optimizing utilization of resources in data centers are some of the challenges facing data center managers. Data center managers want a resilient infrastructure that consistently supports diverse applications and services and protects the applications and services against disruptions. A properly planned and operating data center network provides application and data integrity and optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for scaling event processing in a network environment is provided and includes maintaining a first portion of a decision tree at a first server in the network environment, delegating a second portion of the decision tree from the first server to a second server, processing event data substantially simultaneously at the first server using the first portion of the decision tree and at the second server using the second portion of the decision tree, wherein the processing comprises determining a match between the event data and information stored at nodes in the decision tree. As used herein, the term "server" includes any software program, or the computer on which that program executes, that provides a specific kind of service to client software executing on the same computer or other computers communicating over a network. Servers can be physical (e.g., computers, rack servers, etc.) or virtual (e.g., virtual machines, emulators, para virtualized servers, application virtualized environment, etc.) In various embodiments, the decision tree is distributed across a plurality of servers in the network, wherein each participating server maintains a local copy of a respective portion of the decision tree and processes the event data using the respective portion.

Example Embodiments

Figure 1:
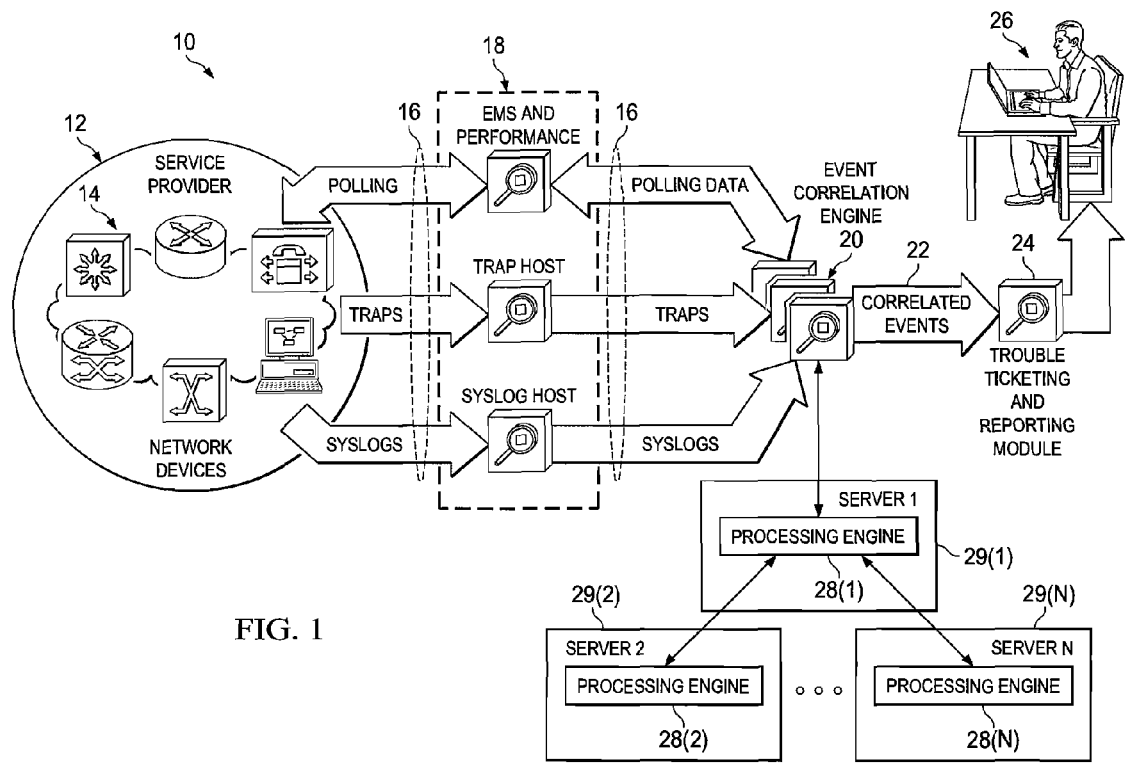
FIG. 1 is a simplified block diagram illustrating a communication system to facilitate scaling event processing in a network environment according to an example embodiment.

Turning to FIG. 1, FIG. 1 is a simplified block diagram illustrating an embodiment of communication system 10 for facilitating scaling event processing in a network environment. Communication system 10 includes a network 12 connective various network devices 14, such as routers, switches, servers, network management applications, and other network elements that may send event data 16 associated with one or more events occurring at network devices 14 to one or more event data collectors 18. As used herein, the term "event" refers to an immutable fact associated with a state change in the network, having temporal constraints (e.g., occurring at certain points in time relative to other events) and amenable to a managed lifecycle (e.g., event loses relevance after a certain time period). Event data 16 can include polling information, trap information, syslogs information, and other such information that pertains to detecting a change of state at one or more network devices 14. Event data collectors 18 can include element management systems (EMS) and performance monitoring modules, trap hosts, syslog hosts, and other network elements capable of identifying and collecting event data 16.

Event data collectors 18 may forward event data 16 to be processed and correlated by one or more event correlation engine 20. Correlated events 22 from event correlation engine 20 may be forwarded to trouble ticketing and reporting module 24, from where they may be retrieved and analyzed by a user 26 (e.g., human operator, such as a network administrator, network analyst, application engineer, etc.). A plurality of processing engines 28(1)-28(n) may facilitate scaling event processing at event correlation engine 20 in communication system 10. In various embodiments, processing engine 28(1) may delegate a portion of the processing and event data 16 to one or more other processing engines (e.g., 28(2)-28(n)). Each processing engine 28(1)-28(n) may execute on respective (distinct) servers 29(1)-29(n).

According to various embodiments, processing engines 28(1)-28(n) may be implemented in a distributed manner across multiple servers (e.g., virtual servers and/or physical servers). In an example embodiment, event detection based on event data 16 may be processed by processing engines 28(1)-28(n) using a decision tree. As used herein, the term "decision tree" encompasses an algorithm that uses tree-like graphs to model and evaluate discrete functions. The decision tree includes "nodes" connected together in branches.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

The decision tree is a form of multiple-variable (or multiple-effect) analysis; the decision tree is composed of nodes, each node containing a test on an attribute, each branch from a node corresponding to a possible outcome of the test, and each leaf containing a prediction (e.g., classification, description, explanation, etc.). The multiple variable analysis capability enables discovery and description of events in the context of multiple influences. Classification algorithms create the decision tree by identifying patterns in an existing pre-classified data set and using that information to create the decision tree. The algorithms learn the patterns in the pre-classified data and create appropriate classification rules to differentiate between the various data in the data set. Using the decision rules identified, the classification logic is run against new data, with no known classification. Each data element is categorized according to the decision tree and appropriate actions can be taken based on the category of the data.

Pattern matching can be used to define classification rules for the decision tree. For example, the Rete algorithm uses pattern matching to arrive at the conclusions. A Rete-based system builds a decision tree, where each node (except the root node) corresponds to a pattern satisfying a condition part of a rule. Each node includes information about the facts satisfied by the patterns of the nodes in the paths from the root up to and including the node. This information is a relation representing the possible values of the variables occurring in the patterns in the path. The path from the root node to a leaf node defines substantially all conditions of a complete rule. As facts are asserted or modified, they propagate along the decision tree, causing nodes to be annotated when the fact matches the pattern. When a fact or combination of facts causes all of the patterns for a given rule to be satisfied, a leaf node is reached and the corresponding rule is triggered. Each node in the decision tree retains a memory of the state of the relevant condition evaluation at the node for a fact or combination of facts.

The decision tree may be implemented in a rules engine, for example, in a production rule system, where facts (e.g., data tuples) are matched against rules to arrive at conclusions that can result in (or indicate) actions. Drools is an example of a rules engine that uses advanced algorithms, such as the Rete algorithm, for processing events according to a predetermined decision tree. Drools processes a streams of events according to the Rete algorithm. Streams share a common set of characteristics: events in the stream are ordered by a timestamp; volumes of events are usually high; atomic events are rarely useful by themselves (e.g., meaning is typically extracted from the correlation between multiple events from the stream and also from other sources); streams may be homogeneous (e.g., contain a single type of events), or heterogeneous (e.g., contain multiple types of events). Streams of events enter the Drools engine at an entry point. Entry points are declared implicitly in Drools by directly making use of them in rules. For example, referencing an entry point in a rule will make the engine, at compile time, to identify and create appropriate internal structures for the rules to support the entry point.

Drools implementation of the Rete algorithm supports coarse grained parallelization in multi-core processors (on a single machine) through partitioning of the decision tree. The decision tree is partitioned in several independent partitions and a pool of worker threads propagate facts through the partitions. The coarse grained parallelization implementation guarantees that at most one worker thread within the machine is executing tasks for a given partition, although multiple partitions may be active at a single point in time.

The Rete decision tree is not configured for parallel execution over multiple machines because the Rete decision tree is stored in its entirety in a single memory element within the Drools engine. This memory element cannot be simply distributed to scale across multiple machines. Scaling across multiple machine may require non-uniform memory access (NUMA), such as cache-coherent NUMA (ccNUMA) and no cache NUMA (ncNUMA). Moreover, distributing portions of the decision tree in different machines may result in serialization of the processing, which can be inefficient, although accurate. However, parallel processing of the decision tree substantially simultaneously at different machine can lead to missing correlation between events, which is also not desirable.

Communication system 10 is configured to address these issues (and others) in offering a system and method for scaling event processing in a network environment. According to an embodiment of communication system 10, a decision tree may be distributed across a plurality of servers 29(1)-29(n) in network 12, wherein each participating server 29(1)-29(n) maintains a local copy of a respective portion of the decision tree and processes event data 16 using the respective portion. "Processing" comprises determining a match between event data 16 and information stored at nodes in the decision tree. For example, processing engine 28(1) may maintain a first portion of a decision tree at a first server 29(1) in network 12, delegate a second portion of the decision tree from first server 29(1) to processing engine 28(2) executing at a second server 29(2), and processing engines 28(1) and 28(2) may process event data 16 substantially simultaneously at first server 29(1)

using the first portion of the decision tree and at second server 29(2) using the second portion of the decision tree, respectively.

In various embodiments, the first processing engine (e.g., 28(1)) may determine a dependency of event data 16 and processing state between second server 29(2) and one or more other servers 29(1)-29(n). As used herein, the term "processing state" at a node in the decision tree includes the output of processing event data according to one or more conditions indicated by the node. For example, a specific node may include a condition that if event data 16 indicates a specific Internet Protocol (IP) address, the output is TRUE. During processing, if event data 16 indicates the specific IP address, the processing state at the node may comprise the output "TRUE."

For example, if polling data indicates that device 14 has failed in network 12; and another syslog data indicates that device 14 has failed in network 12; the polling data and the syslog data may be dependent on each other (e.g., correlated) if they both indicate the same device. In another example, a specific node in the decision tree may be invoked based on the processing state (e.g., outcome) of processing event data 16 at another node in the decision tree; hence the nodes and corresponding processing states may be dependent on each other based on event data 16. If a dependency is found, processing engine 28(1) may revoke a delegation lock to the second server after processing at second server 29(2), retrieve the processed event data and the second portion of the decision tree from second server 29(2), and distribute the processed event data and the second portion of the decision tree to substantially all other servers (e.g., 29(1), 29(3)-29(n)) having the dependency.

In some embodiments, processing engine 28(1) may determine a relation of subsequent event data 16 to the previous event data 16 and may delegate processing of subsequent event data 16 to second server 29(2) according to the determined relation. For example, processing engine 28(1) may determine that subsequent event data 16 is related to the previous event data 16 (e.g., both event data 16 may relate to the same IP address); hence, processing of subsequent event data 16 may be delegated to processing engine 28(2), which processed the previous event data 16.

In many embodiments, the processing state may be returned to first server 29(1) after processing is completed on second server 29(2) (and other delegated servers ((e.g., servers 29(3)-29(n) to which the processing has been delegated, in whole, or in part, by the first processing engine (e.g., 28(1))). In one example embodiment, processing engine 28(1) may delegate a third portion of the decision tree to a third server. Processing engine 28(3) on the third server may substantially simultaneously process event data 16 at the third server. Processing engine 28(1) may cause processing engine 28(2) to push processing state from the second server to the third server and terminate the processing at the second server.

In some embodiments, the processing may be sequential rather than parallel. For example, processing engine 28(1) may push the processed event data after processing from first server 29(1) to second server 29(2); processing engine 28(2) at second server 29(2) may process event data 16 and the processed event data from first server 29(1) according to the second portion of the decision tree. In some embodiments, the delegated servers 29(2)-29(n) may locally update the respective portions of the decision tree (e.g., local update of second portion of the decision tree at the second server, etc.) and may return the updated portions to first server 29(1) as needed. In many embodiments, the decision tree may be delegated if either memory usage or processor usage on first server 29(1) (and other servers) exceed respective predetermined thresholds (and/or according other rules or policies).

According to various embodiments, processing engines 28(1)-28(n) may include a modified Drools engine configured to create a decision tree data structure when a node (or a field in the node) is added to (e.g., linked with, associated with, etc.) another node. During execution, the decision tree may be initially present in the first processing engine (also called a startup processing engine) 28(1) in first server 29(1). When second processing engine 28(2) starts up in second server 29(2), the startup processing engine 28(1) can push the complete decision tree or a portion of the decision tree ("partial tree") to the second processing engine 28(2).

A distributed lock mechanism and sharing of the decision tree and processing state on both the processing engines 28(1)-28(2) may be provided according to various embodiments. (A lock is a programming language construct that allows one thread to take control of a variable and prevent other threads from reading or writing it, until that variable is unlocked. The lock is a synchronization mechanism for enforcing limits on access to a resource in an environment where there are many threads of execution. The lock is designed to enforce a mutual exclusion concurrency control policy.) In addition, if core data is being updated, the core data may be synchronized between the two processing engines 28(1) and 28(2). In another example, if processing is specific to the second processing engine 28(2), then further processing may be delegated to the second processing engine 28(2).

In some embodiments, the processing at one processing engine 28(1) may comprise a certain specific type of processing, with no dependency on processing states or event data in other processing engines (e.g., 28(2)-28(n)). Such processing may include mutually exclusive events, or mutually exclusive nodes (in the decision tree), or mutually exclusive processing algorithms, for example. In such embodiments, if the partial tree is sent to second processing engine 28(2), second processing engine 28(2) can hold a delegation lock on the partial tree with its own processing logic. The decision tree would save the processing state and execution algorithm in the second server's memory element. A portion of the decision tree may be processed on first server 29(1), and another portion of the decision tree may be processed on second server 29(2). The processing in first processing engine 28(1) and second processing engine 28(2) may be completely asynchronous as the events, being mutually exclusive, have dependencies on each other.

In another embodiment, the decision tree may include nodes that are mutually exclusive and nodes that may depend on the state of another node. If the decision tree is partially delegated to second processing engine 28(2), the delegation lock may be revoked at a point in the decision tree execution where the dependency arises. The decision tree contents and processing state may be returned to all appropriate processing engines 28(1)-28(n) executing at least a portion of the decision tree. In some embodiments, the decision tree may be updated on all substantially all servers 29(1)-29(n) processing the decision tree. In other embodiments, the decision tree may be updated only on the server responsible for further processing of the decision tree.

In some embodiments, mutually exclusive data, state, algorithms, new fields, etc. may be added to the decision tree. The update may affect a particular portion of the decision tree, rather than the whole tree. The processing engine holding a delegation lock for the particular portion of the decision tree can locally update the decision tree data structure and cache it appropriately. The updated portion of the decision tree may be returned when the delegation lock is recalled.

In embodiments where virtual machines use cache memory that may reside on the same server or on multiple servers, Least Recently Used (LRU) LRU algorithms can use operations as described herein for storing L1 and L2 level caches. The cache may be fetched when a need arises for the relevant page in memory; otherwise, the cache may be pushed on a lower end virtual machine. A state of the server may be created and relevant processing and processing state may be pushed to another server to continue the processing. The delegation lock may be maintained on the server executing the process. In various embodiment, each processing engine may include a distributer (e.g., embodied in software, hardware, any combination of those) that decides when to distribute the decision tree, collect it back, etc., for example, to facilitate self-utilization of memory, including cache memory, tree data structures, processing power and utilization of processing resources, and various other appropriate parameters.

Embodiments of communication system 10 can facilitate execution of partial trees in a distributed network and computing environment. A delegated node in the decision tree may be marked for future updates at the processing engine where it is executed. A specific processing engine may be configured (e.g., provisioned, set, etc.) to process certain types of requests, events, and nodes. Uniqueness of the partial tree may be revoked to permit synchronization during execution of the decision tree. Tree level lock delegation and partial processing delegation may be configured appropriately in various embodiments. The state may be returned to the top level node (e.g., at the startup processing engine), for example, to facilitate uniform processing. Embodiments of communication system 10 can revoke partial locks and synchronize data appropriately, facilitate saving memory resources as needed.

Embodiments of communication system 10 provide a distributed caching mechanism, with an advantage of local caching and partial processing. Embodiments of communication system 10 can virtualize at least a portion of the decision tree processing performed on the same server, for example, facilitating overall throughput by scaling to multiple servers. Increased throughput of event processing and event correlation can improve detection of root cause in failures and improved turnaround time, facilitating better maintainability of networks and enhanced service level agreements for network service providers.

Embodiments of communication system 10 may be implemented in a cloud based distributed and heterogeneous architecture. Embodiments of communication 10 may be implemented in various situations where multiple servers share resources, such as distributed event processing, distributed topology correlation, managing syslogs and traps in networks, transformations or event enrichment involving one-to-one modification of attributes, de-duplication of files on a file system (e.g., for comparison and analysis of files), spam filtering, virus scanning, improving performance of central mail scanning servers, discovering hidden relations between texts and events, calendar related applications where two unrelated events could be merged or related from two different accounts, banking or finance industry (e.g., to process rules for giving discounts or benefits for customers), and myriad other such applications. Embodiments of communication system 10 can be implemented for any data structure, including RETE trees, Splay trees, RB Trees, tries, hash tables, lists etc.

Turning to the infrastructure of communication system 10, the network topology can include any number of servers, load-balancers, switches (including distributed virtual switches), routers, and other nodes inter-connected to form a large and complex network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs. Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

The network topology illustrated in FIG. 1 is simplified for ease of illustration, and may include any suitable topology, including tree, ring, star, bus, etc. in various embodiments. For example, the network may comprise Transparent Interconnection of Lots of Links (TRILL) network, access/edge/core network, etc. The example network environment may be configured over a physical infrastructure that may include one or more networks and, further, may be configured in any form including, but not limited to, LANs, wireless local area networks (WLANs), VLANs, metropolitan area networks (MANs), wide area networks (WANs), virtual private networks (VPNs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In some embodiments, processing engine 28 can execute on event correlation engine 20. In other embodiments, processing engine 28 can execute in one or more routers or switches in network 12. In other embodiments, processing engine 28 can include dedicated hardware service appliances dedicated to performing event processing and connected to one or more routers or switches in network 12. In yet other embodiments, processing engine 28 can include a suitable combination of hardware and software modules executing in an appropriate network element in network 12. Network elements can include computers, network appliances, servers, routers, switches, gateways, bridges, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

Figure 2:
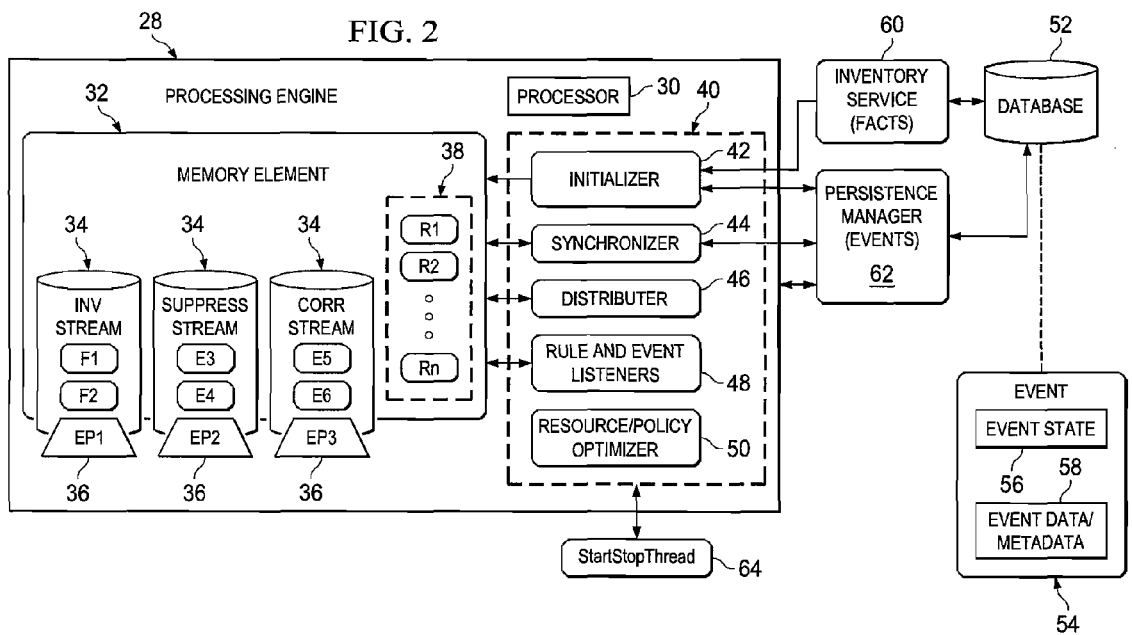
FIG. 2 is a simplified block diagram illustrating example details of the communication system in accordance with one embodiment.

Turning to FIG. 2, FIG. 2 is a simplified block diagram illustrating example details of an embodiment of communication system 10. Example processing engine 28 may include a processor 30 and a memory element 32. Memory element 32 may include one or more event streams 34, for example, inventory (INV) stream, suppress stream, and correlated (CORR) stream. Each stream 34 may include corresponding entry points (EP) 36. As used herein, the term "stream" encompasses a partition of events within a memory element (e.g., memory element 32). Rules 38 may be used to process events. In some embodiments, rules 38 may comprise a tree data structure, with nodes R1, R2, . . . Rn added according to suitable event processing algorithms. The decision tree data structure may comprise any appropriate format, including RETE trees, Splay trees, Red-Black (RB) Trees, tries, hash tables, lists, etc.

Processing engine 28 may include a Drools engine 40, which can comprise an initializer 42, a synchronizer 44, a distributer 46, a rule and event listener 48, and a resource and policy optimizer 50 (among other modules). In various embodiments, initializer 42 may sort events 54 in appropriate streams 32 according to general rules, for example, event type (e.g., whether the event is a correlated event, an inventory event, a suppressed event, etc.) Initializer 42 may also place events 54 at entry points 36 in a predetermined order. Synchronizer 44 may synchronize tree data structures, event states, processing state, etc. among multiple servers according to various embodiments. Distributer 46 may receive data using various mechanisms, such as web service, Java Message Service (JMS), trap, syslog, event, etc. Distributer 46 may initiate and initialize rules 40, threshold values, configuration, push conditions (among other parameters). Distributer 46 may keep track of distributed processing of the decision tree data structure in various servers. Rule and event listener 48 may be configured to listen to specific rules and events based on the specific event processing algorithm and distribution operations. Resource and policy optimizer 50 may run various optimizing algorithms based on the resource data collected from various servers, to facilitate distributer 46 in its decision to offload the decision tree data structure to specific servers.

A database 52 may store one or more events 54. Each event 54 may be associated with an event state 56 (e.g., unprocessed, in processing, waiting, processed, root case, sympathetic, forwarded, etc.). Database 52 may comprise a relational database, correlated queue, router, or other suitable component configured to store event 54. An inventory service 60 may retrieve facts (e.g., static events) from database 54 and provide them to processing engine 28. A persistence manager 62 may retrieve event 54 from database 52 and provide it to processing engine 28. A StartStopThread 64 may start or stop a process executing in processing engine 28. In various embodiments, persistence manager 62 may permit a continued existence of event 54's state even after the process using event 54 ends in processing engine 28. In some embodiments, persistence manager 62 may comprise a Java Persistence Application Programming Interface (JPA).

Figure 3A:
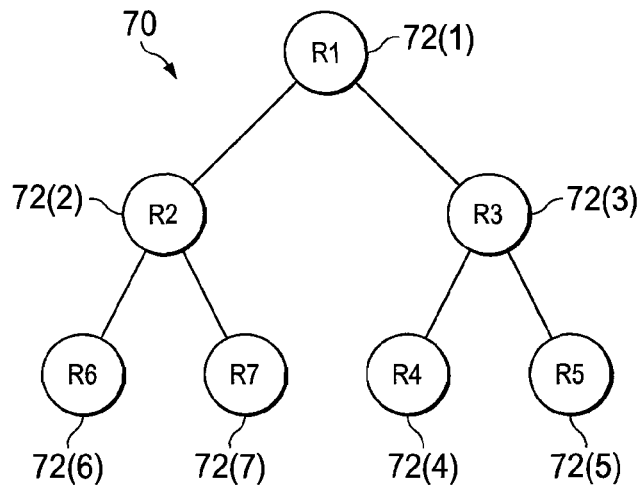
FIGS. 3A and 3B are simplified block diagrams illustrating other example details of the communication system in accordance with one embodiment.
Figure 3B:
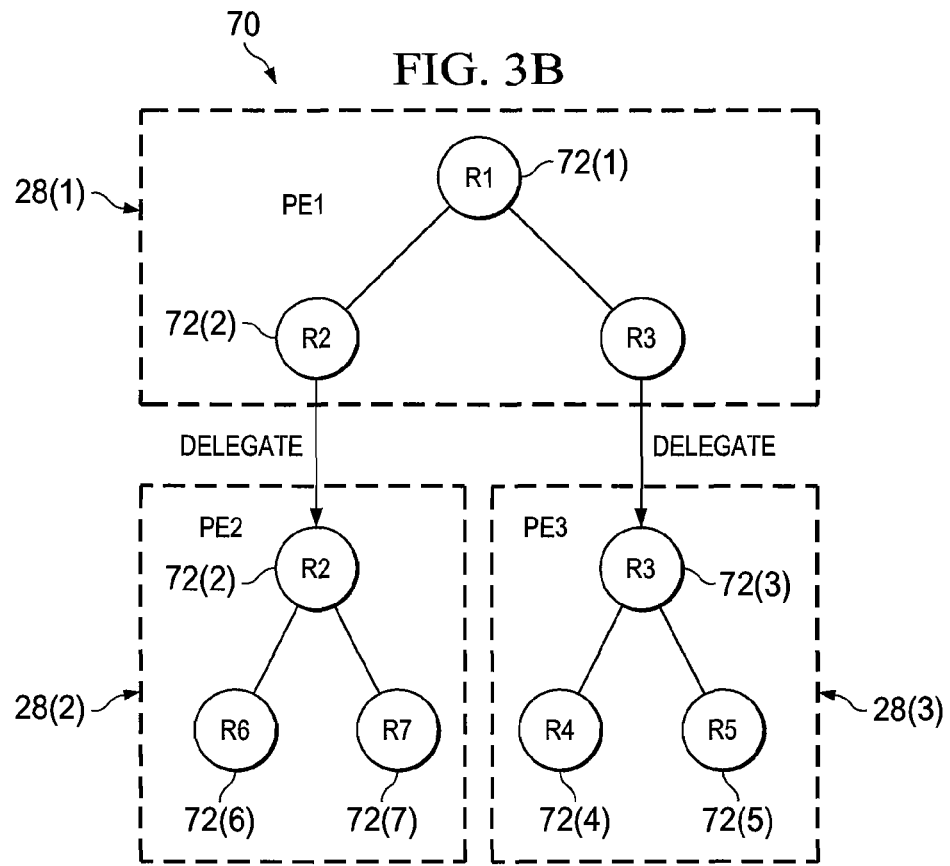

Turning to FIG. 3A, FIGS. 3A and 3B are simplified block diagrams of an example rule tree 70. Example tree 70 includes a set of nodes 72 (e.g., 72(1)-72(7)) that may be empty or may satisfy one of the following conditions: (i) there is a distinguished node r, called the root node (e.g., node 72(1)), and (ii) the remaining nodes are divided into disjoint subsets, each of which is a sub-tree. In the example rule tree 70, node 72(1) is the root node and a parent node of nodes 72(2)-72(7), which are considered child nodes of root node 72(1). The degree of the node is the number of non-empty sub-trees the node contains (e.g., leaf node, for example, nodes 72(4)-72(7), has a degree of zero).

Each node 72 of rule tree 70 may include a subset of rules 38. When event 54 is received and processed, rule tree 70 may be walked (e.g., by a runtime walker) to determine a matching rule, which may be used to determine an action to take with the received event. For example, if event 54 is received that contains data matching rule R7 (node 72(7)), rule tree 70 is walked (e.g., traversed) to find matching rule R7. Event 54 may be first passed through root node 72(1), which contains all rules 40. Node 72(1) may be cut (e.g., subdivided) into two children 72(2) and 72(3). Subsequent processing at node 72(2) may indicate that the event should be passed to child node is determined that the packet should be passed to child node 72(7), where the event is matched with rule R7.

FIG. 3A illustrates delegation of rule tree 70 from processing engine (PE) 28(1) (e.g., PE1) to PE 28(2) and PE 28(3). Event 54 may be processed at node 72(1), which may be cut into nodes 72(2) and 72(3). If event 54 includes data matching rules included in nodes 72(2) and 72(3), processing of event 54 by node 72(2) may be delegated to PE 28(2); likewise, processing of event 54 by node 72(3) may be delegated to PE 28(3).

Figure 4:
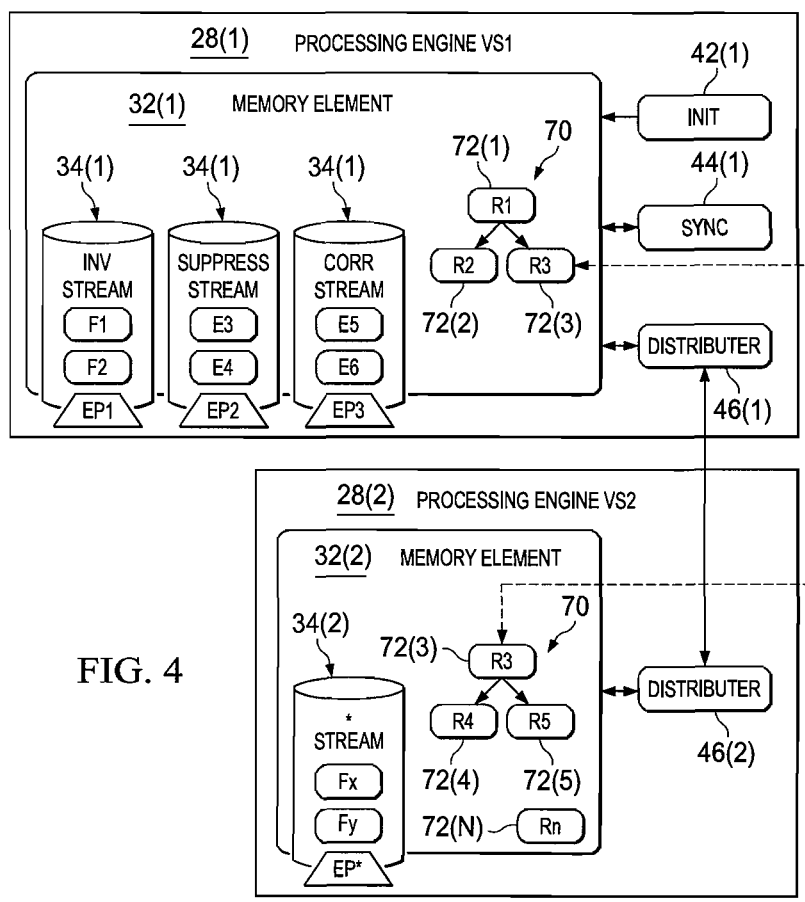
FIG. 4 is a simplified block diagram illustrating yet other example details of the communication system in accordance with one embodiment.

Turning to FIG. 4, FIG. 4 is a simplified block diagram illustrating example details of an embodiment of communication system 10. Processing engine 28(1) includes memory element 32(1), which stores streams 34(1). Initializer 42(1) in processing engine 28(1) may initialize decision tree 70 in memory element 32(1). Decision tree 70 may include nodes 72(1) (root node), 72(2) and 72(3). Assume, merely for example purposes, and not as a limitation, that distributer 46(1) determines that memory and/or processor usage to process event data in streams 34(1) may exceed respective predetermined thresholds in processing engine 28(1).

Distributer 46(1) may delegate data and processing to processing engine 28(2). Delegated data may be stored as stream 34(2) in memory element 32(2) of processing engine 28(2). For example, inventory stream from processing engine 28(1) may be delegated to processing engine 28(2); facts Fx, Fy, etc. stored in inventory stream in processing engine 28(1) may be copied over to processing engine 28(2), for example, by synchronizer 44(1). In other example, events E5, E6, etc., in correlation stream in processing engine 28(1) may be copied over to stream 34(2) of processing engine 28(2). Distributer 46(1) may delegate a portion of decision tree 70 to processing engine 28(2), for example by delegating node 72(3) and nodes originating therefrom (e.g., 72(4), 72(5) . . . 72(n)) to processing engine 28(2). Further processing of event data in stream 34(2) in processing engine 28(2) may be according to the portion of decision tree 70 delegated to processing engine 28(2).

Figure 5:
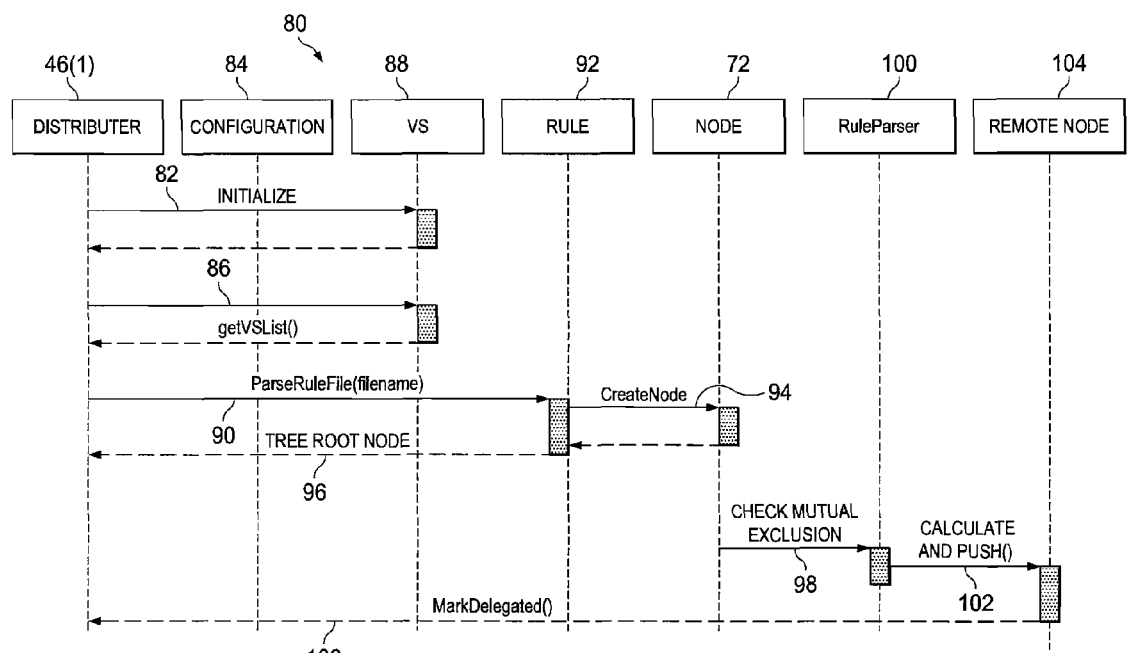
FIG. 5 is a simplified sequence diagram illustrating potential example operations that may be associated with an embodiment of the communication system.

Turning to FIG. 5, FIG. 5 is a simplified sequence diagram illustrating example operations 80 that may be associated with embodiments of communication system 10. At 82, distributer 46(1) may initiate and initialize configuration 84, which can comprises substantially all rules, threshold values, configuration settings, push conditions, and other parameters associated with distributing and processing decision tree 70 in network 12. For example, a rule may specify that when the memory and/or processor usage in processing engine 28(1) exceeds respective predetermined thresholds, processing may be delegated to another server. In another example, a configuration setting may indicate that the memory element at the delegated server accept streams of events. During initialization, distributer 46(1) may store relevant configuration 84 in memory element 32.

At 86, distributer 46(1) may poll network 12 and get a list of substantially all servers 88 that can be used to delegate processing of events and decision tree 70 as appropriate. At 90, distributer 46(1) may parse a file including substantially all rules 92 associated with delegating decision tree 70 in network 12. At 94, node 72 may be created (or triggered, or recalled into memory element 32(1)) based on relevant conditions. For example, the first event data 16 to be processed may trigger calling a node (e.g., 72(1)) in decision tree 70 with the associated conditions of the node. Node 72(1) may be identified as a tree root node at 96. Additional nodes 72 may be triggered during subsequent processing of event data 16.

During further processing, distributer 46(1) may determine that decision tree may be delegated to processing engine 28(2) (and other processing engines in other servers in network 12). For example, a decision may be made to delegate node 72(3) to processing engine 28(2). At 98, distributer 46(1) may check mutual exclusion of data and processing states at a rule parser 100. Distributer 46(1) may calculate and push the created node (e.g., 72(3)) to processing engine 28(2) at 102. A RemoteNode object 104 may be created in processing engine 28(1) to maintain a delegated stage of the delegated node 72(3). For example, RemoteNode object 104 in processing engine 28(1) may indicate that node 72(3) has been delegated to processing engine 28(2). At 106, the delegated node (e.g., 72(3)) may be marked as such by distributer 46(1).

Event data 16 and processing of event data 16 may be delegated temporarily to processing engine 28(2). Processing engine 28(1) may maintain a state of the data and processing by keeping track of RemoteNode object 104 created for each delegated node. Distributer 46(1) may mark the delegated portion of decision tree 70 as delegated. For maintaining the relationship with the parent decision tree 70, processing engine 28(1) may also mark any associated node (e.g., node 72(4)) as delegated. In addition, any subsequent event data 16 that is related to the previously delegated event data 16 may be marked as delegated and pushed to processing engine 28(2).

Distributer 46(1) may be capable of revoking the delegation. At revocation, event data 16 and processing state may be pushed back to processing engine 28(1) from processing engine 28(2). Revocation may be used in various scenarios, such as processing of non-mutually exclusive event data 16; updating of partial tree; updating of event data; etc. In some embodiments, processing engine 28(1) may push sub-processing of some attributes of event data 16 (rather than all of event data 16) to processing engine 28(2).

Figure 6:
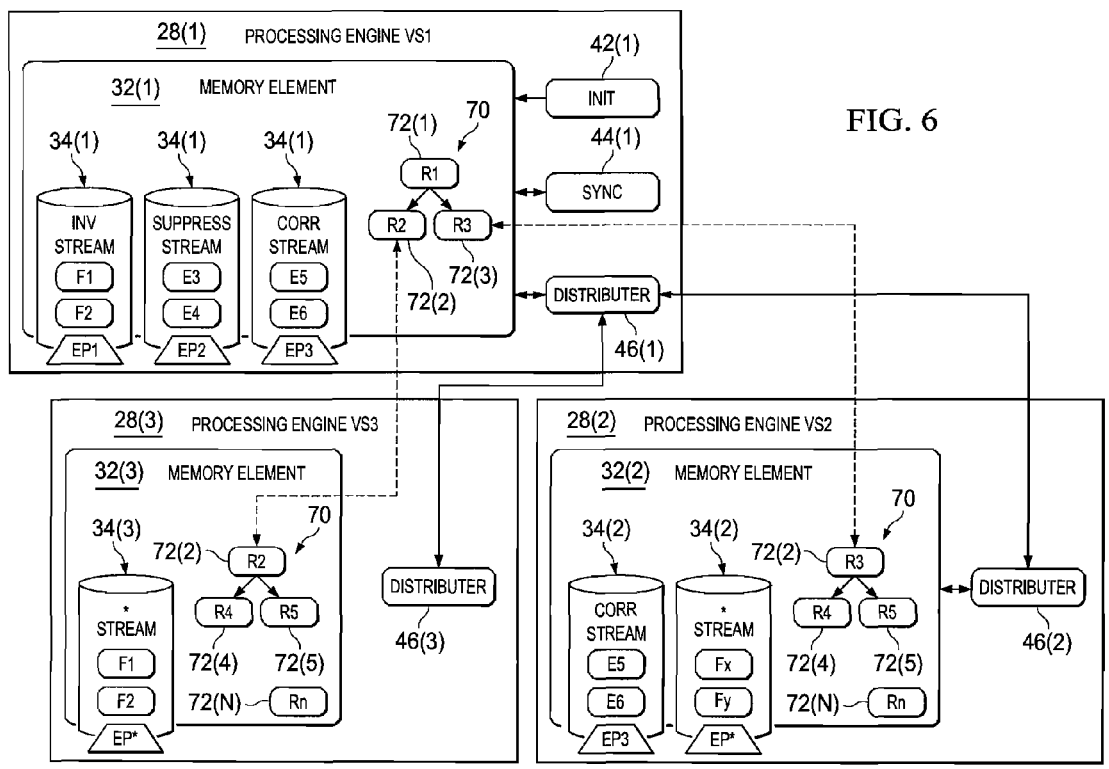
FIG. 6 is a simplified block diagram illustrating other example details that may be associated with an embodiment of the communication system.

Turning to FIG. 6, FIG. 6 is a simplified block diagram illustrating example details of sub-processing according to an embodiment of communication system 10. In general, a first portion of decision tree 70 may be maintained in processing engine 28(1); a second portion of decision tree 70 may be sent to processing engine 28(2) executing on a server different from processing engine 28(1); and a third portion of decision tree 70 may be sent to processing engine 28(3) executing on a server different from processing engine 28(1) or 28(2). A distributed lock mechanism and sharing of decision tree 70 and processing state may be implemented on the servers. If core data (e.g., relevant to all processing engines) is updated at processing engine 28(1), the core data is synced between processing engines 28(1)-28(3). If part of the processing is specific to processing engine 28(2), further processing may be delegated to processing engine 28(2), to the exclusion of other processing engines (e.g., 28(1) and 28(3)).

Figure 7:
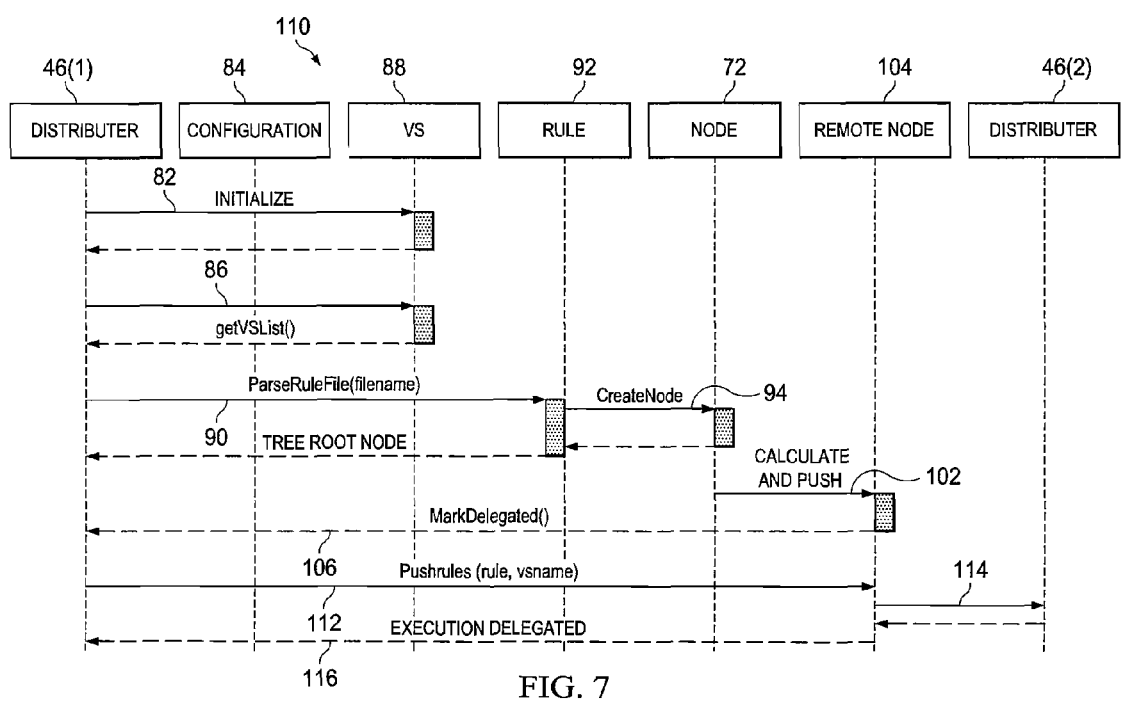
FIG. 7 is a simplified sequence diagram illustrating yet other example operations that may be associated with an embodiment of the communication system.

Turning to FIG. 7, FIG. 7 is a simplified sequence diagram illustrating example operations 110 according to an embodiment of communication system 10. At 82, distributer 46(1) may initiate and initialize configuration 84. At 86, distributer 46(1) may poll network 12 and get a list of substantially all servers 88 that can be used to delegate processing of events and decision tree 70 as appropriate. At 90, distributer 46(1) may parse a file including substantially all rules 92 associated with delegating decision tree 70 in network 12. At 94, node 72 may be created based on relevant conditions. For example, the first event data 16 to be processed may trigger calling a node (e.g., 72(1)) in decision tree 70 with the associated conditions of the node. Node 72(1) may be identified as a tree root node at 96. Additional nodes 72 may be triggered during subsequent processing of event data 16.

During further processing, distributer 46(1) may determine that decision tree may be delegated to processing engine 28(2) (and other processing engines in other servers in network 12). For example, a decision may be made to delegate node 72(3) to processing engine 28(2). Distributer 46(1) may calculate and push the created node (e.g., 72(3)) to processing engine 28(2) at 102. RemoteNode object 104 may be created in processing engine 28(1) to maintain a delegated stage of the delegated node 72(3). At 106, the delegated node (e.g., 72(3)) may be marked as such by distributer 46(1). At 112, distributer 46(1) may push rules and the virtual server name to remote node object 104. At 114, remote node object 104 may push the rules to distributer 46(2) in processing engine 28(2). At 116, distributer 46(1) may mark the execution as delegated.

In some embodiments, execution delegation can be revoked based on the data being processed. Processing engine 28(1) may process part of event data 16, and subsequently hand over the processed data to processing engine 28(2) for further processing. In some embodiments, event data 16 may be stored in processing engine 28(3), but processing may have been delegated to processing engine 28(3). Distributer 46(1) can pause the processing at processing engine 28(3), push processing state and related data to processing engine 28(3) from processing engine 28(2) and continue therefrom.

Figure 8:
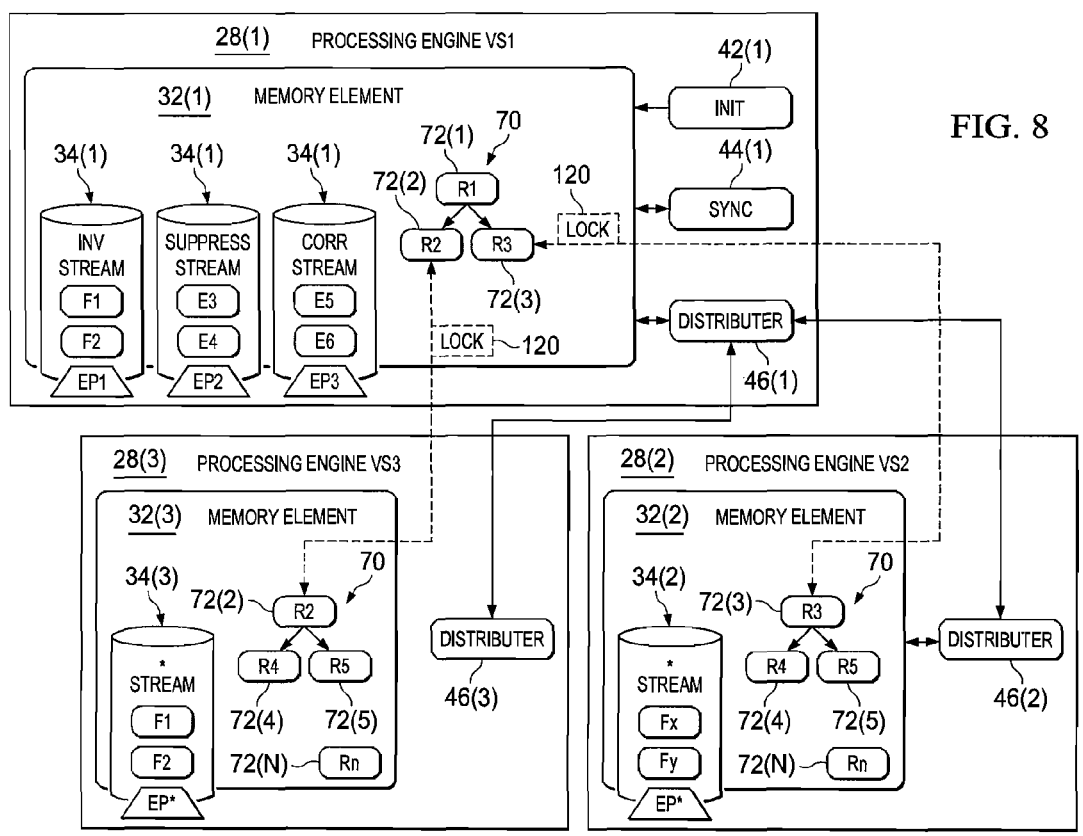
FIG. 8 is a simplified block diagram illustrating yet other example details that may be associated with an embodiment of the communication system.

Turning to FIG. 8, FIG. 8 is a simplified block diagram illustrating example details associated with mutually exclusive processing according to an embodiment of communication system 10. A first portion of decision tree 70 may be maintained in processing engine 28(1); a second portion of decision tree 70 may be pushed to processing engine 28(2); and a third portion of decision tree 70 may be pushed to processing engine 28(3). The processing may be specific to a certain type of processing and event data 16 and processing state at processing engines 28(1), 28(2) and 28(3) may not include any mutual dependencies. Such mutual exclusivity may be determined from the conditions associated with decision tree 70. Processing engine 28(2) may hold a delegation lock 120 on the partial tree with processing logic that it holds. The partial tree may store the processing state and the execution algorithm also in memory element 32(2). Processing at processing engines 28(1)-28(3) may be substantially completely asynchronous in such embodiments.

Figure 9:
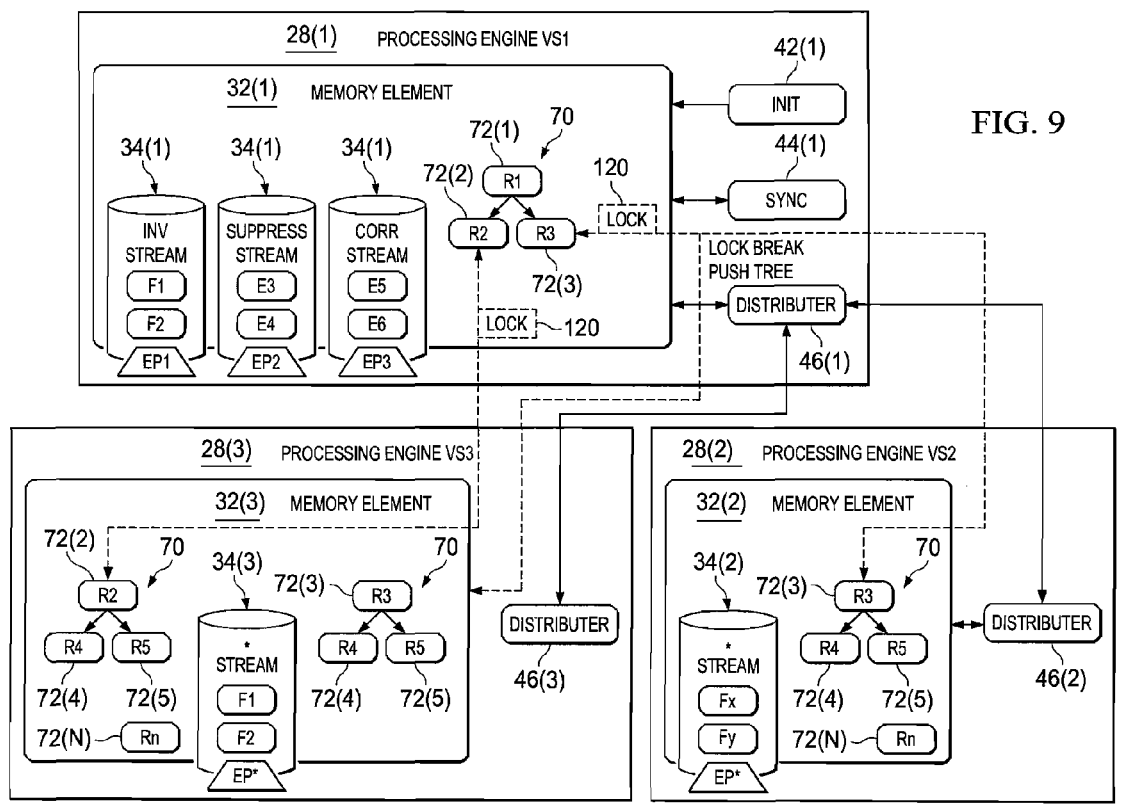
FIG. 9 is a simplified block diagram illustrating yet other example details that may be associated with an embodiment of the communication system.

Turning to FIG. 9, FIG. 9 is a simplified block diagram illustrating example details of an embodiment of communication system 10. Processing of decision tree 70 at processing engine 28(1)-28(3) may proceed substantially completely asynchronously until a point is reached when mutual exclusivity ends. For example, further processing may require a condition present in the portion of decision tree 70 executing on another server. In another example, further processing may be affected by processing state on another server. When mutual exclusivity terminates, delegation lock 120 to the processing engine (e.g., 28(2)) holding the non-mutually exclusive portion of decision tree 70 and/or state may be revoked (e.g., lock break) and tree contents returned (e.g., pushed) to substantially all processing engines (e.g., 28(1), 28(3)) processing decision tree 70. In addition, the processing state may be returned sent to substantially all processing engines (e.g., 28(1), 28(3)). Alternatively, the portion of decision tree 70 and/or processing state may be sent to the specific processing engine (e.g., 28(3)) with a need for the information (e.g., the specific processing engine needs the information to further process event data 16 using decision tree 70).

Figure 10:
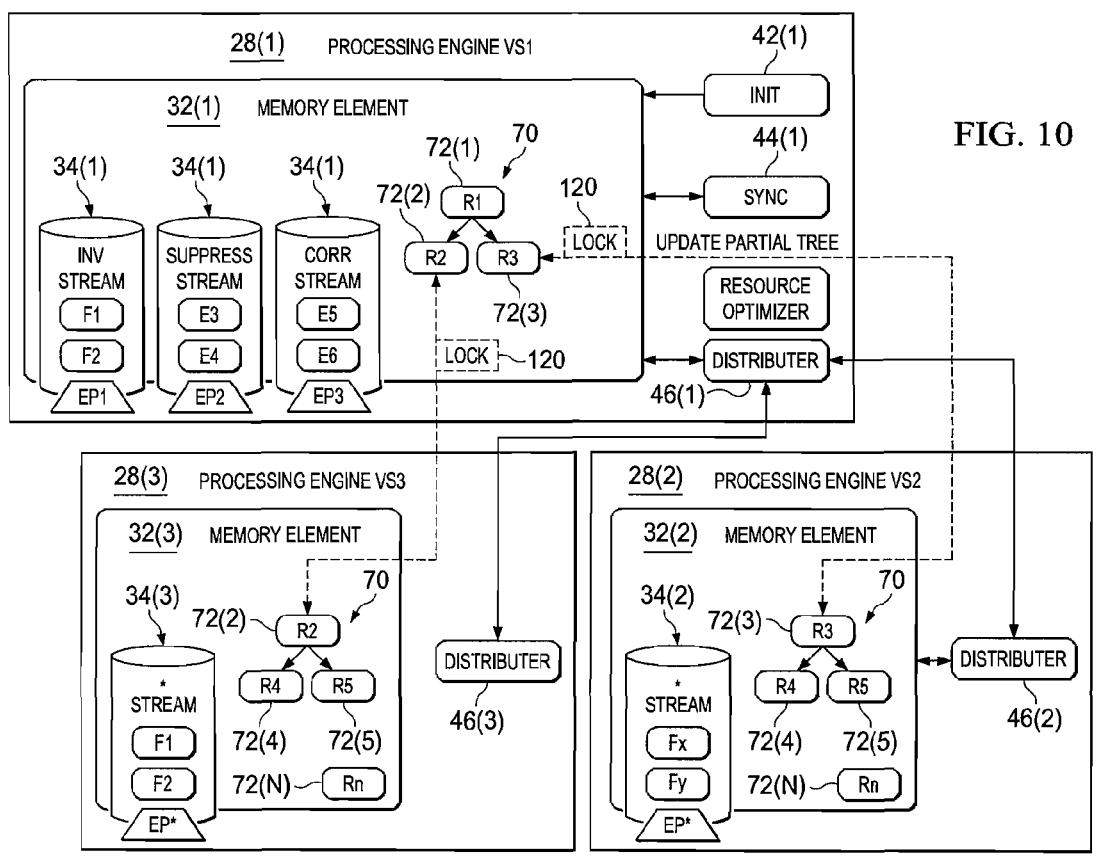
FIG. 10 is a simplified block diagram illustrating yet other example details of the communication system in accordance with one embodiment.

Turning to FIG. 10, FIG. 10 is a simplified block diagram illustrating example details associated with updating partial trees according to embodiments of communication system 10. Data such as event data 16, processing state, attributes, algorithms, new fields for decision tree 70 and other parameters may be added to processing engine 28(1) during processing of event data 16 using decision tree 70. If the data being added at processing engine 28(1) is mutually exclusive and relevant only to processing engine 28(2) (e.g., as determined by delegation lock 120 on the portion of decision tree 70 being updated with data), processing engine 28(2) may locally update and cache the portion of decision tree 70 being processed therein. When delegation lock 120 is recalled, the updated decision tree 70 may be returned to processing engine 28(1). In embodiments where ccNUMA or cnNUMA is used, the execution would be revoked from processing engine 28(2), and the tree would not be returned thereto after updating.

Figure 11:
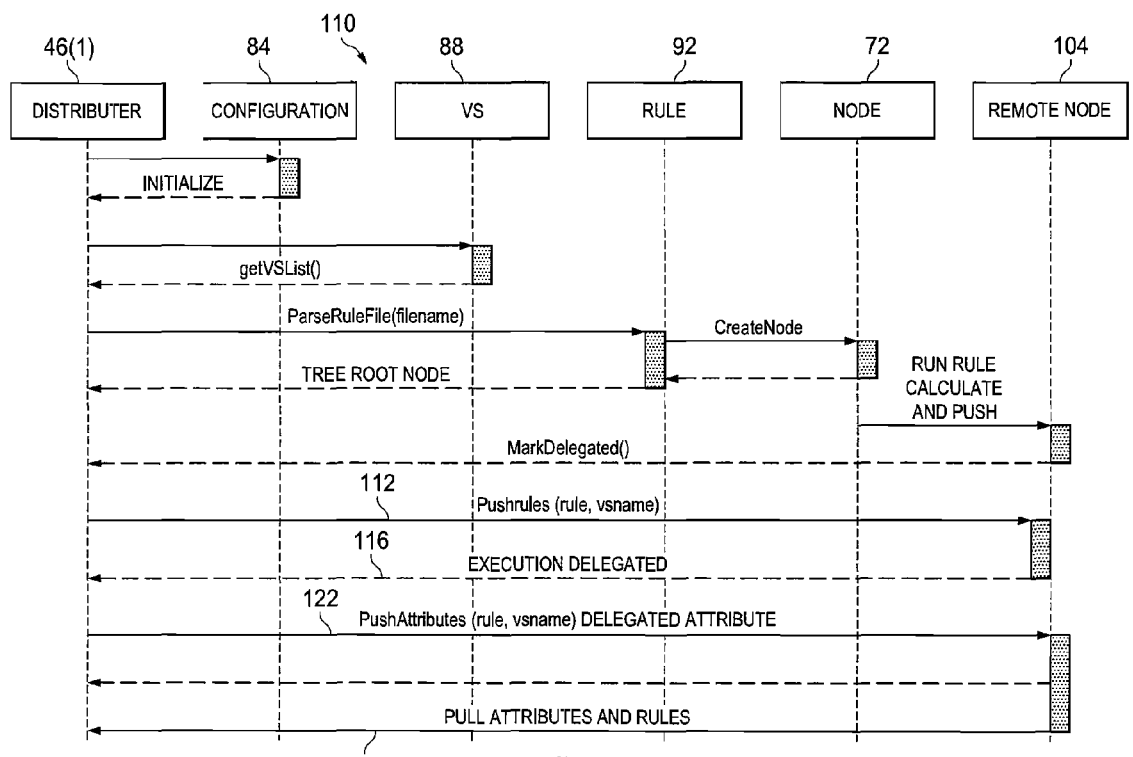
FIG. 11 is a simplified sequence diagram illustrating potential example operations that may be associated with an embodiment of the communication system.

Turning to FIG. 11, FIG. 11 is a simplified sequence diagram illustrating example operations that may be associated with embodiments of communication system 10. At 82, distributer 46(1) may initiate and initialize configuration 84. At 86, distributer 46(1) may poll network 12 and get a list of substantially all servers 88 that can be used to delegate processing of events and decision tree 70 as appropriate. At 90, distributer 46(1) may parse a file including substantially all rules 92 associated with delegating decision tree 70 in network 12. At 94, node 72 may be created based on relevant conditions. The root node (e.g., node 72(1)) may be identified as such at 96.

During further processing, distributer 46(1) may determine that decision tree may be delegated to processing engine 28(2) (and other processing engines in other servers in network 12). Distributer 46(1) may calculate and push the created node (e.g., 72(3)) to the delegated processing engine (e.g., 28(2)) at 102. RemoteNode object 104 may be created in processing engine 28(1) to maintain a delegated stage of the delegated node 72(3). At 106, the delegated node (e.g., 72(3)) may be marked as such by distributer 46(1). At 112, distributer 46(1) may push rules and the virtual server name to remote node object 104. At 114, remote node object 104 may push the rules to distributer 46(2) in processing engine 28(2). At 116, distributer 46(1) may mark the execution as delegated.

Distributer 46(1) may include a rule that determines which node in decision tree 70 uses a particular node often, and may indicate that the node be pushed to the appropriate processing engine. For example, the rule in distributer 46(1) may determine that node 72(4) uses node 72(3) often. If processing of event data 16 according to node 72(4) has been delegated to processing engine 28(2), the rule may indicate that processing of 72(3) should also be pushed to processing engine 28(2), for example, to enhance mutual exclusivity as much as possible.

At 122, the changed attributes of node 72 may be pushed to remote node object 104. If a particular attribute of a node is delegated, the delegation can be revoked and delegated to a different processing engine that can make appropriate changes to the delegated attributes. At 124, distributer 46(1) may also pull attributes and rules, for example, to update the execution delegation to a different processing engine based on the data being processed. For example, if the data is present on processing engine 28(2), and event data 16 is being processed on processing engine 28(3), distributer 46(1) can update the data on processing engine 28(3), for example, by pulling all the processing state related data from processing engine 28(2) and pushing it on processing engine 28(3), and continue processing of event data 16 according to decision tree 70 accordingly.

Figure 12:
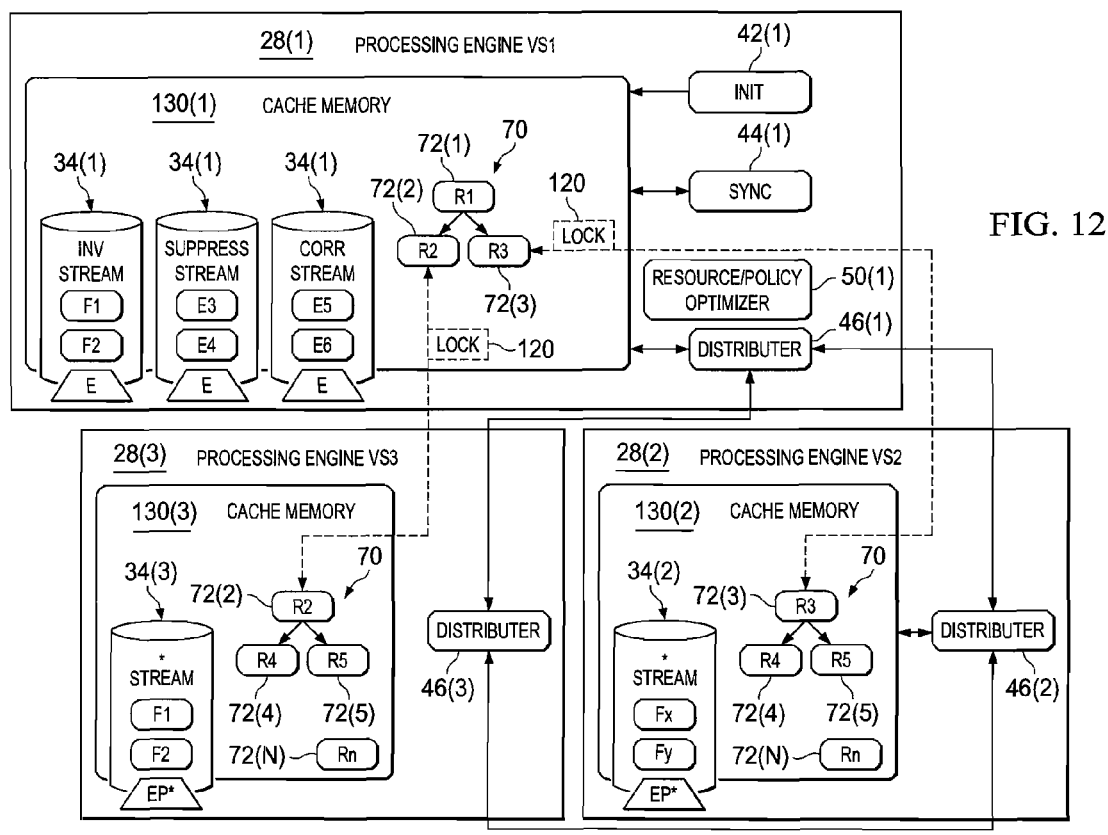
FIG. 12 is a simplified block diagram illustrating potential example details that may be associated with an embodiment of the communication system.

Turning to FIG. 12, FIG. 12 is a simplified block diagram illustrating example details associated with using a caching memory according to embodiments of communication system 10. Memory element may include cache memory located, for example, proximate processors. The cache memory may reside on (e.g., located in) the same server or on multiple servers. Appropriate LRU algorithms can use cache memory mechanism for storing L1 and L2 level caches. Each processing engine 28(1)-28(3) may include cache memory 130(1)-130(3), respectively. As used herein, the term "cache memory" refers to a particular kind of memory element 32 wherein pages are used to store data. Pages storing unused data may be pushed to lower end servers as appropriate. A state of the server may also be created and appropriate action and state pushed to another server to continue the processing. Delegation lock 120 may be maintained on the server that implements the processing.

Resource/policy optimizer 50(1) may include suitable policies (e.g., delegate if memory usage exceeds predetermined threshold, etc.) useful for the delegation. Resource/policy optimizer 50(1) may facilitate optimizing the load on each server. The decision to distribute processing, to revoke delegation lock, to pull back data, etc. can be indicated by appropriate rules, for example, such that utilization of memory element 32(1) (including cache memory 130(1)), data structures, processing power and utilization of central processing unit (CPU) resources, can be self-optimized to enable sharing resources with other servers.

Suitable rules can optimize cache processing, facilitate collection and unification of data structures, and other optimization actions as appropriate. Policies may be converted to (e.g., written as) rules, for example, to provide quality of service (QOS) in event data processing. Scaling in terms of memory, processing, caching, etc. can be achieved with embodiments of communication system 10. For example, each server may be aware of the state of execution of event data 16 according to decision tree 70 (or algorithm used to process event data 16) on various other servers, facilitating scaling. The processing delegation to virtual servers can facilitate mobility of tasks during the processing of event data 16.

Figure 13:
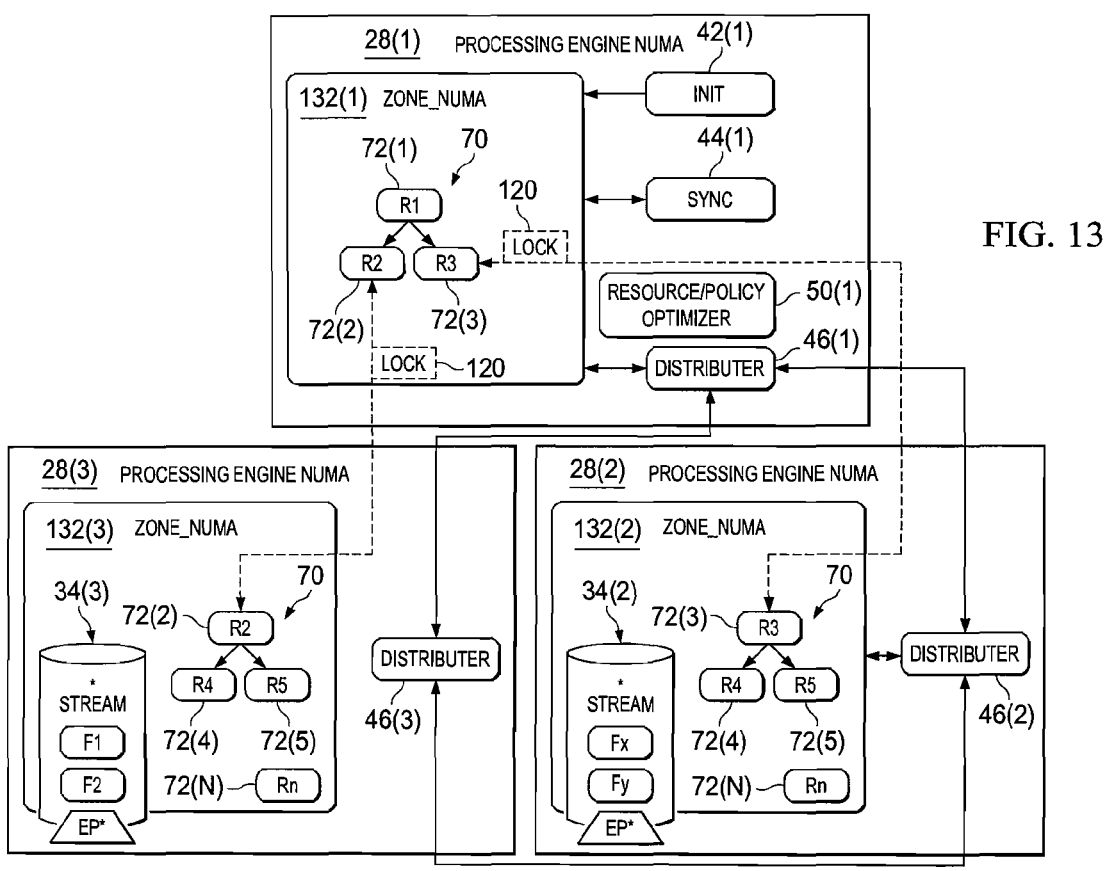
FIG. 13 is a simplified block diagram illustrating yet other example details of the communication system in accordance with one embodiment.

Turning to FIG. 13, FIG. 13 is a simplified block diagram illustrating example details associated with NUMA according to embodiments of communication system 10. NUMA is a computer architecture used in multiprocessor systems in which the time required for a processor to access memory depends on the memory's location relative to the processor. NUMA attempts to close the gap between the speed of processors and the memory they use by providing separate memory on a per-processor basis, thus avoiding the performance hit caused when multiple processors try to access the same memory. Each block of dedicated memory is known as a NUMA node or NUMA zone. According to various embodiments, the block of NUMA memory accessed by various processors may reside on same server or on multiple servers. Processing delegation to other servers can facilitate mobility of tasks during processing of event data 16 according to decision tree 70 (or other suitable algorithm).

Figure 14:
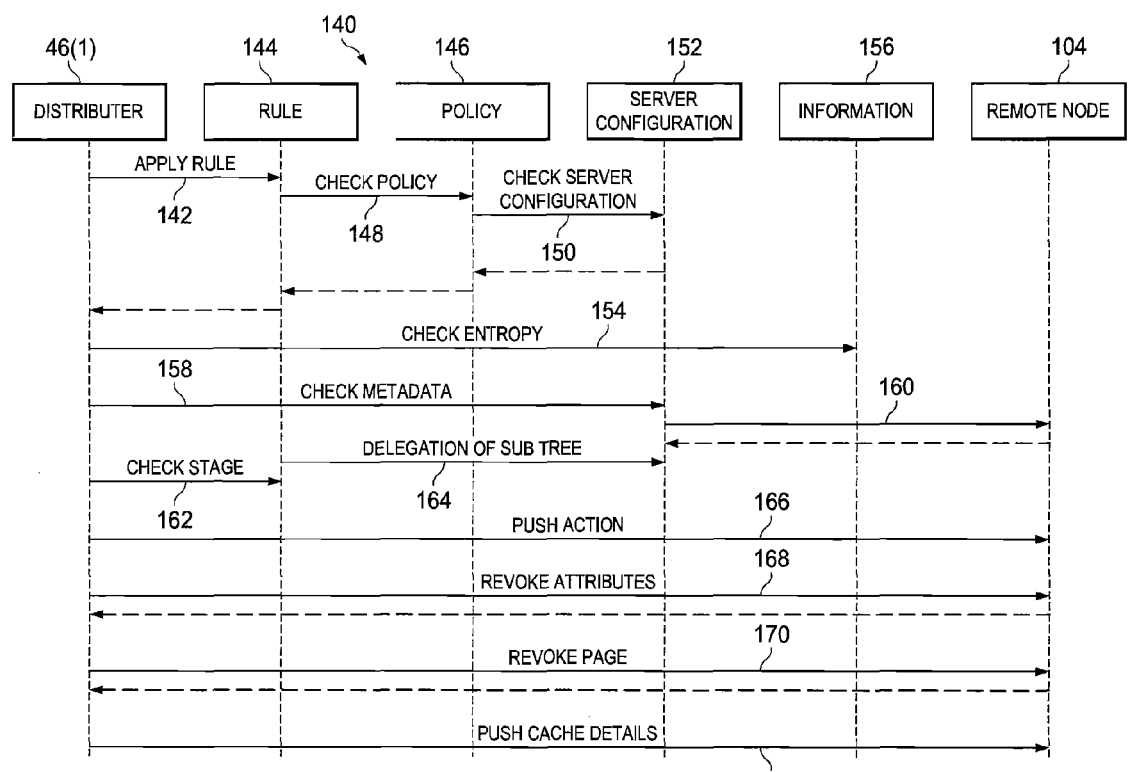
FIG. 14 is a simplified sequence diagram illustrating yet other example operations that may be associated with an embodiment of the communication system.

Turning to FIG. 14, FIG. 14 is a simplified sequence diagram illustrating example operations that may be associated with embodiments of communication system 10. Distributer 46(1) may keep track of the metadata page tables and multi-level page directories. The pages and metadata may be delegated to other processing engines 28 executing on other servers. In some embodiments, multi-level delegation may be implemented, with substantially all nodes executing in various processing engines 28 collectively comprising decision tree 70. In such embodiments, the delegated server may apply its local rules for pushing and delegation. In some embodiments, unused pages may be delegated to low configuration servers. On the other hand, highly used pages may be delegated to servers whose pages are being utilized more effectively. The delegation may be revoked when the processing is delegated to a different server (e.g., processing engine 28(2)) and the data may be pushed to that server. Data on processing engine 28(1) may be revoked and a portion of decision tree 70 relevant to further processing may be pushed to processing engine 28(2) on the different server. Updates to the data can be handled by processing engine 28(2) until the delegation in revoked.

In various embodiments, distributer 46(1) may get a list of servers capable of executing processing engine 28. The list may include information about the servers, such as type, heartbeat and health of each server. At 142, distributer 46(1) may check for rules 144 present on the servers. Rules 144 may be included in policies 146, which may be checked at 148. At 150, server configuration 152 may be checked. For example, a specific node 72 having type X of decision tree 70 may be processed by processing engine 28(2), which includes rules of type X. Locality of reference may also be managed appropriately by distributor 46(1).

At 154, entropy of information 156 may be checked. At 158, metadata may be checked. Server configurations may be offloaded to remote node object 104 at 160. At 162, stage may be checked. At 164, sub-tree may be delegated. At 166, action on event data 16 according to sub-tree may be pushed to remote node object 104. For example, distributer 46(1) may execute rules for health check and if health check conditions are met, distributer 46(1) may push further processing of event data 16 to the server that the matches the health condition. If attributes of tree node 72 match one or more criterion according to a particular rule, the attributes may be pushed to the delegated server. The pushed attributes may be marked as not present on the delegating server, and metadata of the remote delegated server may be added and associated with the delegated attributes.

LRU algorithms may be executed to determine least used nodes in decision tree 70. The unused attributes and rules may be pushed to a remote server, for example, to free up local memory and processor resources. Portions of decision tree 70, including individual nodes 72 may be delegated based on historical information of the stability of the remote server, or based on information about locality and frequency of use of nodes 72 in decision tree 70. At 168, delegated attributes may be revoked. At 170, the delegated page may be revoked. At 172, cache details may be pushed to remote node object 104.

Figure 15:
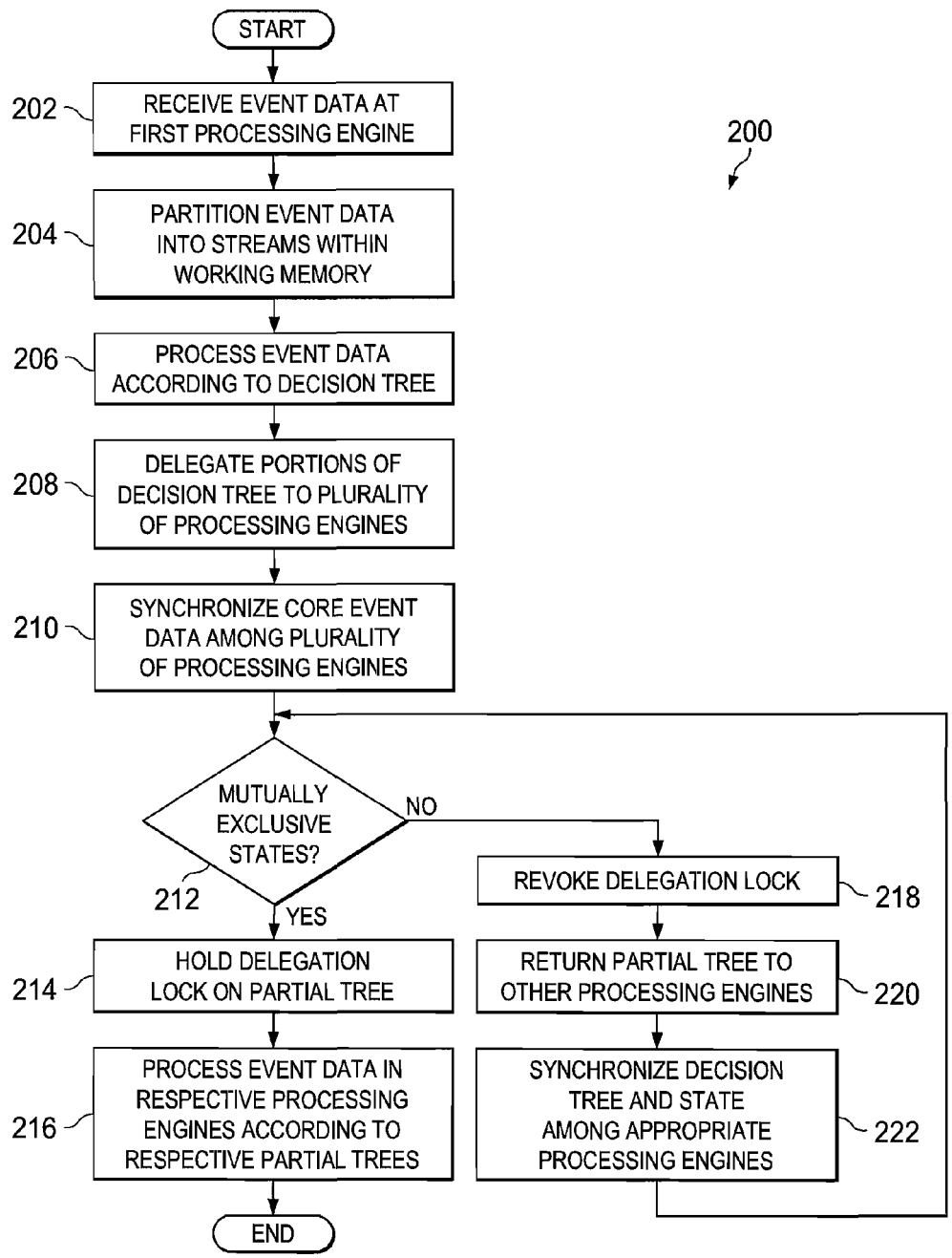
FIG. 15 is a simplified flow diagram illustrating yet other example operations that may be associated with an embodiment of the communication system.

Turning to FIG. 15, FIG. 15 is a simplified flow diagram illustrating example operations 200 that may be associated with embodiments of communication system 10. At 202, event data 16 may be received at processing engine 28(1). At 204, event data 16 may be partitioned into streams 34 within working memory of memory element 32(1). At 206, streams 34 may be processed according to decision tree 70. At 208, a decision may be made to delegate portions of decision tree 70 to plurality of processing engines (e.g., 28(2)-28(n)). At 210, core event data 16 may be synchronized among plurality of processing engines 28(1)-28(n).

At 212, a determination may be made whether delegated data and/or partial trees are mutually exclusive (e.g., based on dependencies between data and/or tree nodes). If the delegation data and/or partial trees are mutually exclusive, at 214, each delegate processing engine (e.g., 28(2)-28(n)) may hold delegation lock (e.g., 120) on the respective partial tree. At 216, event data 16 in respective processing engines 28(1)-28(n) may be processed according to respective partial trees.

Turning back to 212, if delegated data and/or partial trees are not mutually exclusive (e.g., based on dependencies between data and/or tree nodes), at 218, the relevant delegation lock to the appropriate processing engine may be revoked. At 220, the partial tree may be returned to other processing engines (e.g., 28(3)-28(n)). t 222, decision tree 70 and processing state may be synchronized among the appropriate processing engines (e.g., 28(3)-28(n)). The operations may continue to 212 for further data and/or processing, as appropriate.

Figure 16:
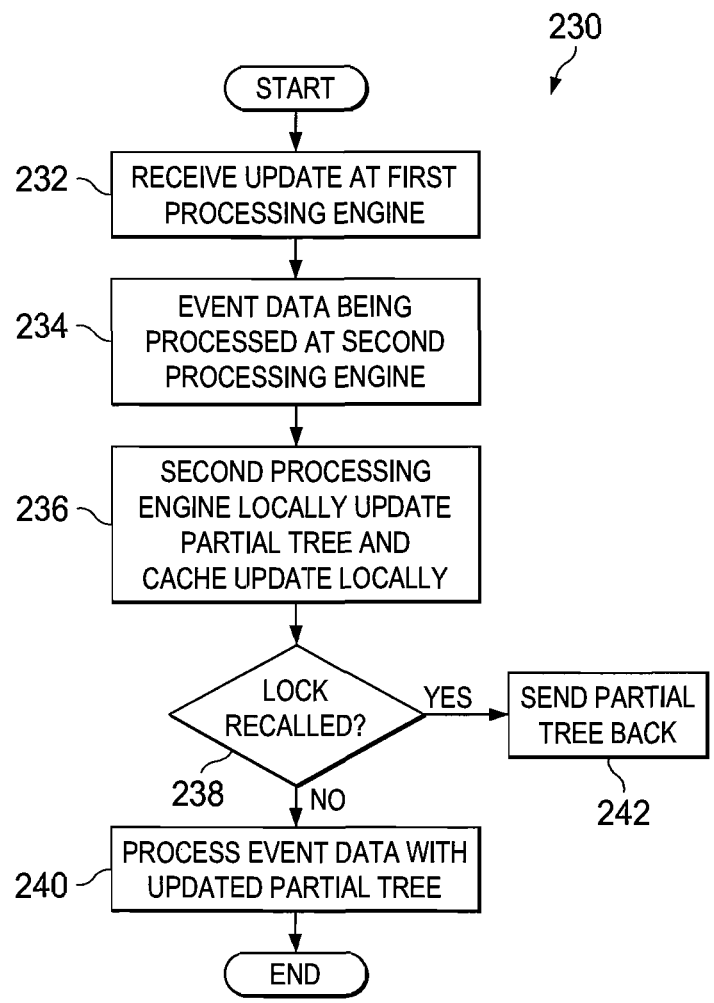
FIG. 16 is a simplified flow diagram illustrating yet other example operations that may be associated with an embodiment of the communication system.

Turning to FIG. 16, FIG. 16 is a simplified flow diagram illustrating example operations 230 that may be associated with embodiments of communication system 10. At 232, updates to event data 16 and/or decision tree 70 may be received at a first processing engine (e.g., 28(1)). At 234, a determination may be made that event data 16 is being processed at a second processing engine (e.g., 28(2)). At 236, the second processing engine may locally update partial tree and cache update locally. At 238, a determination may be made whether delegation lock 120 to the second processing engine (e.g., 28(2)) has been recalled. If delegation lock 120 has not been recalled, at 240, event data 16 may be processed with the updated partial tree. On the other hand, if delegation lock 120 has been recalled, at 242, the partial tree may be returned (with or without updates) to the first processing engine (e.g., 28(1)).

Figure 17:
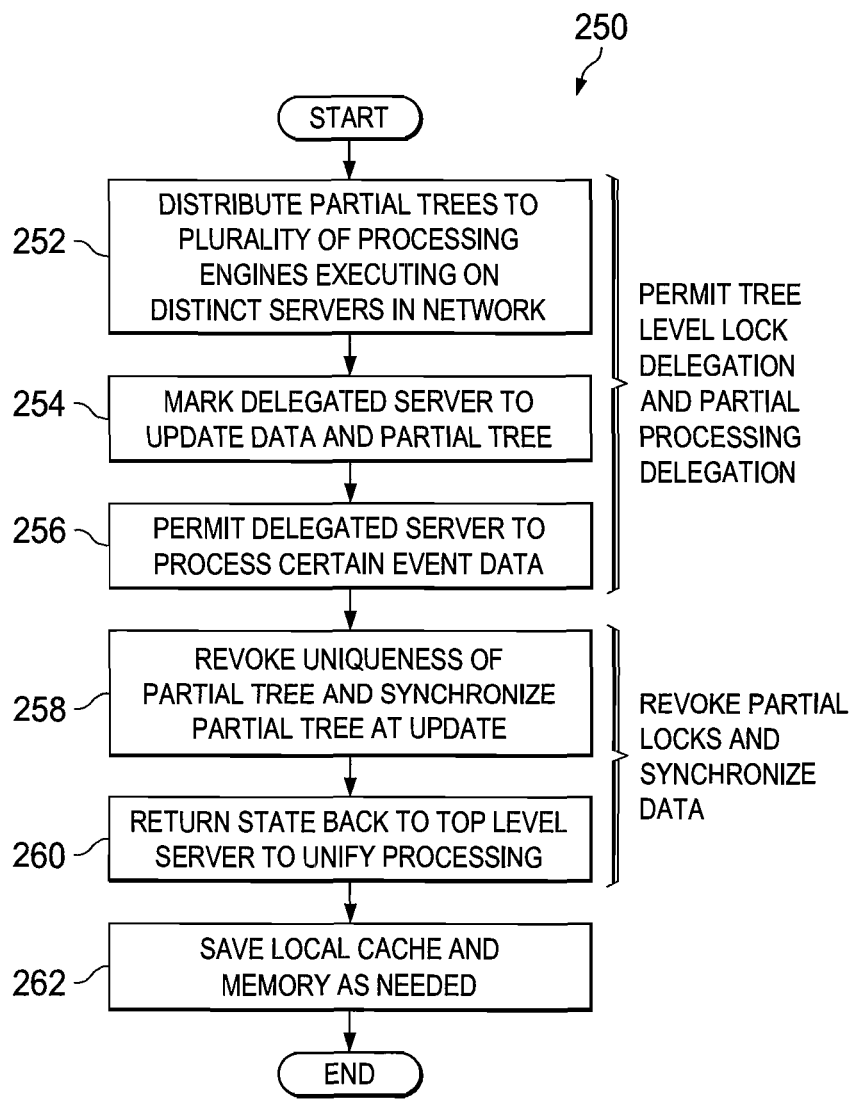
FIG. 17 is a simplified flow diagram illustrating yet other example operations that may be associated with an embodiment of the communication system.

Turning to FIG. 17, FIG. 17 is a simplified flow diagram illustrating example operations 250 that may be associated with embodiments of communication system 10. At 252, partial trees may be distributed to a plurality of processing engines 28(1)-28(n) executing on different servers in network 12. At 254, the delegated servers may be marked to update the corresponding partial trees and data. At 256, the delegated server may be permitted to process certain event data. Operations 252-256 may indicate permitting tree level lock delegation and partial processing delegation.

At 258, uniqueness of partial tree may be revoked and the partial tree synchronized at update. At 260, the processing state may be returned back to the top level server (e.g., executing processing engine 28(1)) to unify processing. Operations 258 and 260 may indicate revocation of partial locks and synchronization of data. At 262, local cache and memory may be saved as needed.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of any executable file comprising instructions that can be understood and processed on a computer, and may further include library modules loaded during execution, object files, system files, hardware logic, software logic, or any other executable modules.

In example implementations, at least some portions of the activities outlined herein may be implemented in software in, for example, processing engines 28(1)-28(n). In some embodiments, one or more of these features may be implemented in hardware, provided external to these elements, or consolidated in any appropriate manner to achieve the intended functionality. The various network elements (e.g., servers, switches) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, processing engines 28(1)-28(n) and corresponding servers described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 32, cache memory 130, ZONE_NUMA 132) can store data used for the operations described herein. This includes the memory element being able to store instructions (e.g., software, logic, code, etc.) in non-transitory computer readable media, such that the instructions are executed to carry out the activities described in this Specification. A processor can execute any type of instructions associated with the data to achieve the operations detailed herein in this Specification. In one example, processors (e.g., processor 30) could transform an element or an article (e.g., data) from one state or thing to another state or thing.

In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory computer readable storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:
1. A method, comprising:
   maintaining, by a first processing engine executing at a first server, a first portion of a decision tree at the first server in a network environment, wherein the decision tree comprises a data structure that uses tree-like graphs to model and evaluate discrete functions;

delegating, by the first processing engine, a second portion of the decision tree from the first server to a second processing engine executing at a second server; and processing event data simultaneously at the first server by the first processing engine using the first portion of the decision tree and at the second server by the second processing engine using the second portion of the decision tree, wherein the processing comprises determining a match between the event data and information stored at nodes in the decision tree, wherein the event data is associated with at least one event occurring at one or more network devices within the network to one or more event data collectors, wherein the simultaneous processing enables fast throughput through multiple processors in the network improving functioning of servers in the network.

2. The method of claim 1, further comprising:
determining a dependency of the event data and processing state between the second server and one or more servers;
revoking a delegation lock to the second server after processing at the second server;
retrieving the processed event data and the second portion of the decision tree from the second server; and
distributing the processed event data and the second portion of the decision tree to all other servers having the dependency.

3. The method of claim 2, further comprising locally updating the second portion of the decision tree at the second server.

4. The method of claim 3, further comprising returning the updated second portion of the decision tree to the first server.

5. The method of claim 1, wherein the second portion of the decision tree is delegated if either memory usage or the processor usage on the first server exceeds respective predetermined thresholds.

6. The method of claim 1, further comprising returning processing state to the first server after processing is completed on the second server.

7. The method of claim 1, further comprising:
delegating a third portion of the decision tree to a third server;
processing event data simultaneously at the third server;
pushing processing state from the second server to the third server; and
terminating the processing at the second server.

8. The method of claim 1, further comprising:
determining a relation of subsequent event data to the previous event data;
delegating processing of the subsequent event data to the second server according to the determined relation.

9. The method of claim 1, further comprising:
pushing the processed event data after processing from the first server to the second server, wherein the second server processes the event data and the processed event data from the first server according to the second portion of the decision tree.

10. The method of claim 1, wherein the decision tree is distributed across a plurality of servers in the network, wherein each participating server maintains a local copy of a respective portion of the decision tree and processes the event data using the respective portion.

11. Non-transitory tangible media encoding logic that includes instructions for execution, which when executed by a processor of a first processing engine executing at a first server, is operable to perform operations comprising:
maintaining, by the first processing engine a first portion of a decision tree at the first server in a network environment, wherein the decision tree comprises a data structure that uses tree-like graphs to model and evaluate discrete functions;

delegating, by the first processing engine, a second portion of the decision tree from the first server to a second processing engine executing at a second server; and processing event data simultaneously at the first server by the first processing engine using the first portion of the decision tree and at the second server by the second processing engine using the second portion of the decision tree, wherein the processing comprises determining a match between the event data and information stored at nodes in the decision tree, wherein event data is associated with at least one event occurring at one or more network devices within the network to one or more event data collectors, wherein the simultaneous processing enables fast throughput through multiple processors in the network improving functioning of servers in the network.

12. The media of claim 11, wherein the operations further comprise:
determining a dependency of the event data and processing state between the second server and one or more servers;
revoking a delegation lock to the second server after processing at the second server;
retrieving the processed event data and the second portion of the decision tree from the second server; and
distributing the processed event data and the second portion of the decision tree to all other servers having the dependency.

13. The media of claim 12, wherein the operations further comprise locally updating the second portion of the decision tree at the second server.

14. The media of claim 11, wherein the operations further comprise:
delegating a third portion of the decision tree to a third server;
processing event data simultaneously at the third server;
pushing processing state from the second server to the third server; and
terminating the processing at the second server.

15. The media of claim 11, wherein the decision tree is distributed across a plurality of servers in the network, wherein each participating server maintains a local copy of a respective portion of the decision tree and processes the event data using the respective portion.

16. A first server, comprising:
a distributer;
a first processing engine;
a memory element for storing data; and
a processor that executes instructions associated with the data, wherein the processor and the memory element cooperate such that the first server is configured for:
maintaining, by the first processing engine, a first portion of a decision tree at the first server in a network environment, wherein the decision tree comprises a data structure that uses tree-like graphs to model and evaluate discrete functions;
delegating, by the first processing engine, a second portion of the decision tree from the first server to a second processing engine executing at a second server; and
processing event data simultaneously at the first server by the first processing engine using the first portion of the decision tree and at the second server by the second processing engine using the second portion of the decision tree, wherein the processing comprises determining a match between the event data and information stored at nodes in the decision tree, wherein event data is associated with at least one event occurring at one or more network devices within the network to one or more event data collectors, wherein the simultaneous processing enables fast throughput through multiple processors in the network improving functioning of servers in the network.

17. The first server of claim 16, further configured for:
determining a dependency of the event data and processing state between the second server and one or more servers;
revoking a delegation lock to the second server after processing at the second server;
retrieving the processed event data and the second portion of the decision tree from the second server; and
distributing the processed event data and the second portion of the decision tree to all other servers having the dependency.

18. The first server of claim 17, further configured for:
updating the second portion of the decision tree at the second server.

19. The first server of claim 16, wherein the decision tree is distributed across a plurality of servers in the network, wherein each participating server maintains a local copy of a respective portion of the decision tree and processes the event data using the respective portion.

20. The first server of claim 16, further configured for:
delegating a third portion of the decision tree to a third server;
processing event data simultaneously at the third server;
pushing processing state from the second server to the third server; and
terminating the processing at the second server.

* * * * *